(12) United States Patent
Takagi et al.

(10) Patent No.: US 10,020,748 B2
(45) Date of Patent: Jul. 10, 2018

(54) ELECTRIC POWER CONVERSION CIRCUIT

(71) Applicant: TOYOTA JIDOSHA KABUSHIKI KAISHA, Toyota-shi, Aichi-ken (JP)

(72) Inventors: Kenichi Takagi, Nagakute (JP); Shuntaro Inoue, Nagakute (JP); Takahide Sugiyama, Nagakute (JP); Kenichiro Nagashita, Susono (JP); Yoshitaka Niimi, Susono (JP); Masaki Okamura, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/241,522

(22) Filed: Aug. 19, 2016

(65) Prior Publication Data
US 2017/0063245 A1 Mar. 2, 2017

(30) Foreign Application Priority Data
Aug. 28, 2015 (JP) .................................. 2015-169312

(51) Int. Cl.
*H02M 3/335* (2006.01)
*H02M 1/14* (2006.01)
(Continued)

(52) U.S. Cl.
CPC ....... *H02M 3/33546* (2013.01); *B60L 15/007* (2013.01); *H02M 1/14* (2013.01); *H02M 3/33576* (2013.01); *B60L 2210/30* (2013.01); *B60L 2210/40* (2013.01); *B60L 2240/526* (2013.01); *B60L 2240/527* (2013.01);
(Continued)

(58) Field of Classification Search
CPC ... H02M 2001/0083; H02M 2001/009; H02M 2001/0093; H02M 3/33546; H02M 3/33561; H02M 3/33569; H02M 3/33576; H02M 3/33584
See application file for complete search history.

(56) References Cited

U.S. PATENT DOCUMENTS

| 2004/0145930 A1* | 7/2004 | Noro .................. H02M 3/33576 363/127 |
| 2007/0195557 A1 | 8/2007 | Su |

(Continued)

FOREIGN PATENT DOCUMENTS

| CN | 203691237 U | 7/2014 |
| JP | 2011-193713 A | 9/2011 |

*Primary Examiner* — Fred E Finch, III
(74) *Attorney, Agent, or Firm* — Sughrue Mion, PLLC

(57) ABSTRACT

An electric power conversion circuit comprises U-phase and V-phase switching circuits, a transformer, and an α-phase switching circuit. A primary winding of a transformer is connected between the U-phase switching circuit and the V-phase switching circuit, and both ends of a secondary winding are connected to the α-phase switching circuit. The α-phase switching circuit comprises positive and negative terminals, a half bridge including and two switching devices, and a voltage divider circuit. The half bridge is provided between the positive terminal and the negative terminal, and a common connection point between the two switching devices is connected to one end of the secondary winding. A voltage divider output point of the voltage divider circuit is connected to the other end of the secondary winding.

10 Claims, 6 Drawing Sheets

(51) Int. Cl.
*B60L 15/00* (2006.01)
*H02M 1/00* (2006.01)

(52) U.S. Cl.
CPC .................. *B60L 2240/529* (2013.01); *H02M 2001/0048* (2013.01); *H02M 2001/0083* (2013.01); *Y02B 70/1491* (2013.01)

(56) References Cited

U.S. PATENT DOCUMENTS

| | | | |
|---|---|---|---|
| 2011/0019454 A1* | 1/2011 | Fotherby | H02M 1/08 363/132 |
| 2011/0198933 A1* | 8/2011 | Ishigaki | B60R 25/00 307/66 |
| 2013/0272032 A1 | 10/2013 | Mueller et al. | |
| 2014/0132066 A1* | 5/2014 | Hirano | H02M 3/33584 307/17 |
| 2015/0229225 A1* | 8/2015 | Jang | H02M 3/285 363/17 |
| 2016/0204707 A1* | 7/2016 | Takahara | H02M 1/4258 363/16 |
| 2016/0294204 A1* | 10/2016 | Deokar | H02M 3/33561 |

\* cited by examiner

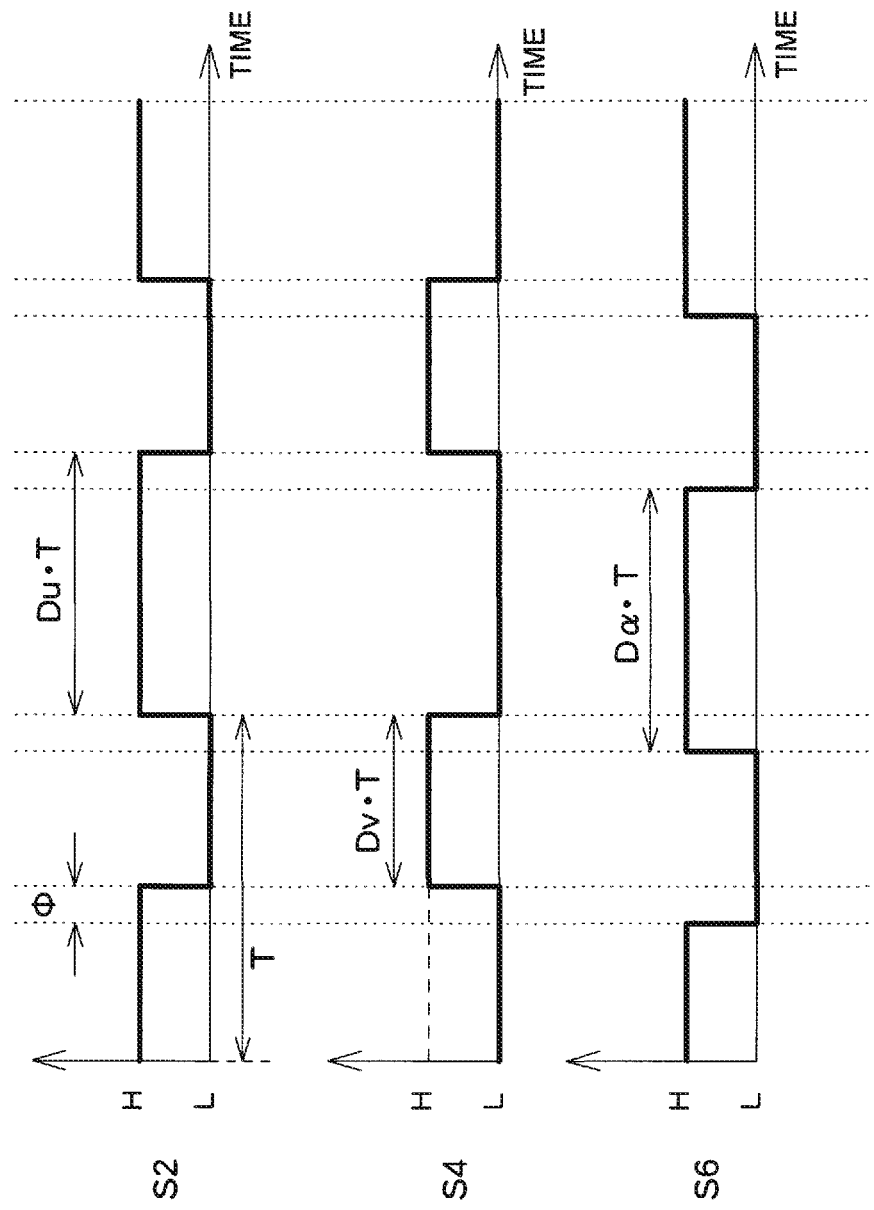

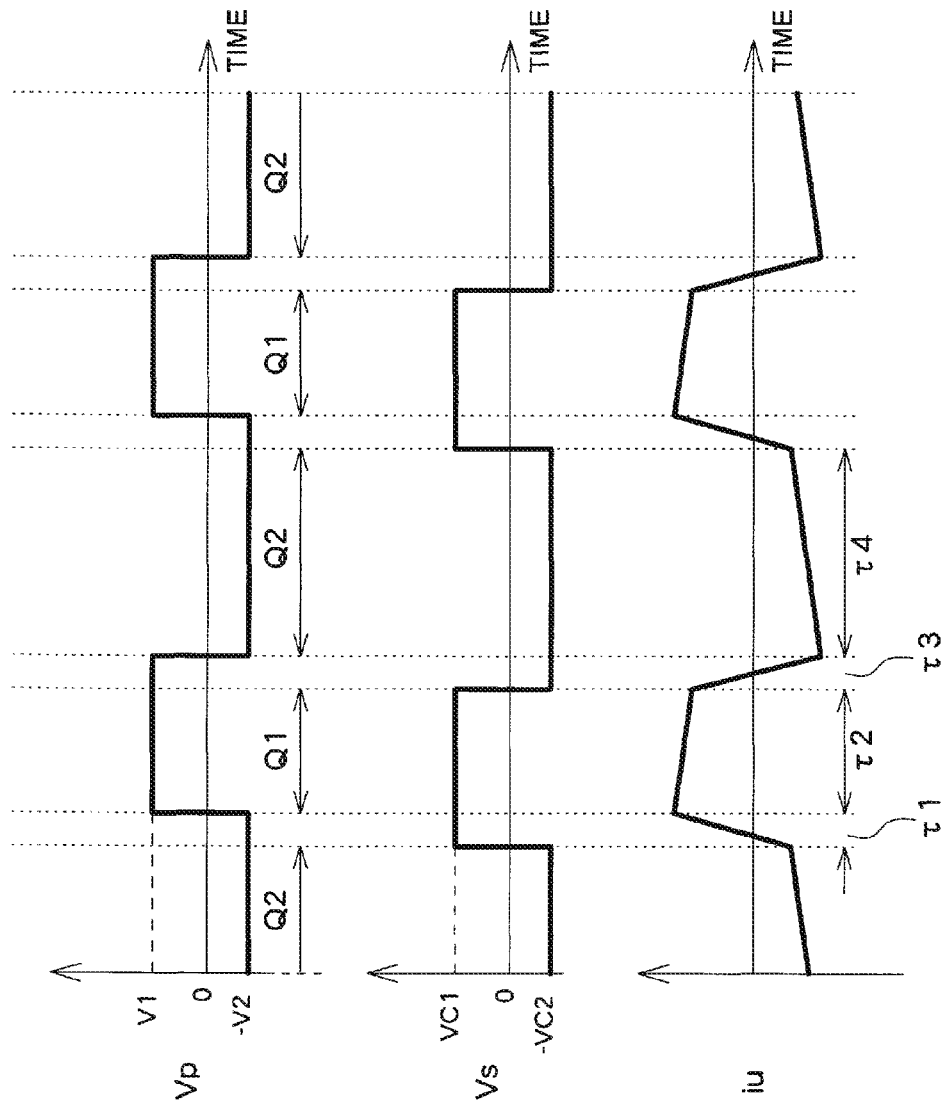

ns the α-phase switching
ELECTRIC POWER CONVERSION CIRCUIT

CROSS REFERENCE TO RELATED APPLICATION

The entire disclosure of Japanese Patent Application No. 2015-169312 filed on Aug. 28, 2015 including specification, claims, drawings, and abstract is incorporated herein by reference in its entirety.

TECHNICAL FIELD

The present disclosure relates to an electric power conversion circuit, and in particular, to a circuit for inputting or outputting DC power at each of a plurality of terminals.

BACKGROUND

Vehicles traveling by using electric power supplied from batteries are in wide use. These types of electric powered vehicles include hybrid automobiles traveling by driving forces of an engine and a motor/generator, and electric automobiles traveling by driving force of a motor/generator.

An electric powered vehicle is equipped with a plurality of accessory apparatuses, such as lighting apparatus, air-conditioning apparatus, and audio apparatus. The battery for driving an electric powered vehicle also supplies electric power to the accessory apparatuses. For this reason, an electric power conversion circuit is provided in the electric powered vehicle for dropping the output voltage of the battery and supplying electric power to the various accessory apparatuses in accordance with the voltage after being dropped.

In general, the supply voltage for an accessory apparatus differs in accordance with the function, purpose, and so forth, of the accessory apparatus. To supply electric power to each of a plurality of accessory apparatuses having different supply voltages, equipping the electric powered vehicle with a plurality of electric power conversion circuits having different step-down ratios can also be considered. However, since a plurality of electric power conversion circuits will be required, a problem arises when the circuitry to be installed in the electric powered vehicle increases in scale.

Thereupon, as disclosed in JP 2011-193713 A, there has been proposed an electric power conversion circuit making possible electric power conversion among a plurality of DC ports.

A transformer is used in an electric power conversion circuit installed in an electric powered vehicle to electrically insulate between the battery and accessory apparatus. In this case, a current not contributing to electric power transmission flows to the transformer, and electric power loss may be large depending on the operation of circuitry connected to the primary winding of the transformer and the operation of circuitry connected to the secondary winding of the transformer.

The present disclosure is intended to reduce the electric power loss in the electric power conversion circuit.

SUMMARY

The present disclosure comprises: a U-phase switching circuit; a V-phase switching circuit; an α-phase switching circuit; and a transformer including a primary winding connected between the U-phase switching circuit and the V-phase switching circuit, and a secondary winding of which both ends are connected to the α-phase switching circuit; wherein the α-phase switching circuit comprises: a DC terminal pair for inputting and outputting a DC voltage; a half bridge comprising two switching devices each having one terminal connected in common, the half bridge being disposed between the two terminals constituting the DC terminal pair; and a voltage divider circuit, disposed between the two terminals constituting the DC terminal pair, for dividing the voltage appearing at the DC terminal pair; wherein a common connection point of the two switching devices in the half bridge is connected to one end of the secondary winding, and a voltage divider output point of the voltage divider circuit is connected to the other end of the secondary winding.

The U-phase switching circuit and the V-phase switching circuit may supply alternately in time a voltage to the primary winding, the half bridge performs switching at a timing in accordance with a timing at which each of the U-phase switching circuit and the V-phase switching circuit supplies voltage to the primary winding, and the voltage divider circuit divides the voltage appearing at the DC terminal pair at a voltage divider ratio of the voltage supplied to the primary winding by the U-phase switching circuit and the voltage supplied to the primary winding by the V-phase switching circuit.

The voltage divider circuit may comprise a first voltage divider capacitor and a second voltage divider capacitor each having one end connected in common to the voltage divider output point, wherein the other end of the first voltage divider capacitor is connected to one of two terminals constituting the DC terminal pair, and the other end of the second voltage divider capacitor is connected to the other of two terminals constituting the DC terminal pair.

The U-phase switching circuit may comprise two switching devices each having one terminal connected in common, and a U-phase half bridge for inputting and outputting a DC voltage at the other terminal of each switching device; the V-phase switching circuit comprises two switching devices each having one terminal connected in common, and a V-phase half bridge for inputting and outputting a DC voltage at the other terminal of each switching device, wherein the primary winding is connected between the common connection point of the two switching devices in the U-phase half bridge and the common connection point of the two switching devices in the V-phase half bridge; a voltage in accordance with the DC voltage which is input and output at the U-phase switching circuit is supplied to the primary winding from the U-phase switching circuit; and a voltage in accordance with the DC voltage which is input and output at the V-phase switching circuit is supplied to the primary winding from the V-phase switching circuit.

A DC voltage may be input or output in a path drawn from a tap on the primary winding.

The U-phase switching circuit and the V-phase switching circuit may comprise a voltage reference conductor, the U-phase switching circuit comprises a first terminal for inputting and outputting a DC voltage with the voltage reference conductor, the V-phase switching circuit comprises a second terminal for inputting and outputting a DC voltage with the voltage reference conductor, a path drawn from a tap on the primary winding comprises a third terminal for inputting and outputting a DC voltage with the voltage reference conductor, and the voltage between the third terminal and the voltage reference conductor is determined in accordance with a voltage between the first terminal and the voltage reference conductor and a voltage between the first terminal and the voltage reference conductor.

According to the present disclosure, electric power loss in the electric power conversion circuit can be reduced.

BRIEF DESCRIPTION OF DRAWINGS

Embodiment(s) of the present disclosure will be described based on the following figures, wherein:

FIG. 3A is a timing chart of a control signal S2 showing primary voltage, secondary voltage, and primary winding current;
FIG. 3B is a timing chart of a control signal S4;
FIG. 3C is a timing chart of a control signal S6;
FIG. 3D shows time variation of voltage (primary voltage) across terminals of a primary winding;
FIG. 3E shows time variation of voltage (secondary voltage) across terminals of a secondary winding;
FIG. 3F shows current flowing to the primary winding.

DESCRIPTION OF EMBODIMENTS (1) Configuration of Electric Power Conversion Circuit FIG. 1 shows an electric power conversion circuit relating to an embodiment of the present disclosure. The electric power conversion circuit is installed in an electric powered vehicle, and supplies electric power to a plurality of electrical devices or receives electric power from a plurality of electrical devices. The electric power conversion circuit may be used not only in electric powered vehicles but also in industrial and consumer electrical equipment.

Figure 1:
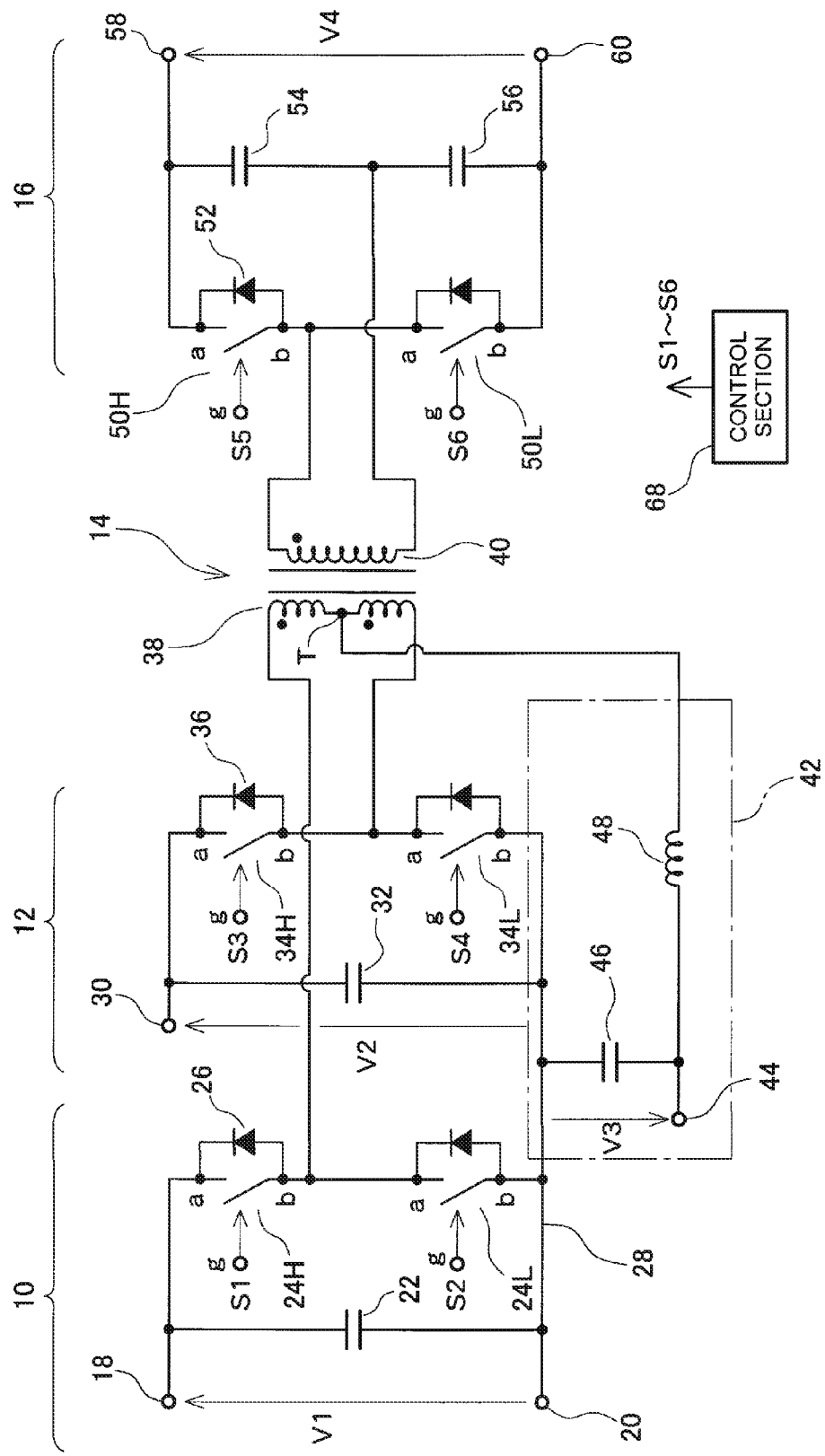
FIG. 1 shows an electric power conversion circuit.

The electric power conversion circuit comprises a U-phase switching circuit 10, a V-phase switching circuit 12, an additional port circuit 42, a transformer 14, and an α-phase switching circuit 16. The U-phase switching circuit 10, the V-phase switching circuit 12, and the additional port circuit 42 have a first terminal 18, a second terminal 30, and a third terminal 44, respectively. Each terminal has a voltage reference terminal 20 for providing a reference voltage. The voltage reference terminal 20 is, for example, connected to the body of the electric powered vehicle. To each terminal, an accessory apparatus or the like having a different supply voltage may be connected as a load apparatus. Furthermore, an electric power storage device, such as a battery or a capacitor, may also be connected. The α-phase switching circuit 16 has a positive terminal 58 and a negative terminal 60 as a pair of DC terminals. To these terminals, electric power storage devices or a voltage converter circuits may be connected besides load apparatuses. The electric power conversion circuit adjusts the voltage of the first through third terminals and the voltage between the positive terminal 58 and the negative terminal 60.

The U-phase switching circuit 10 has an upper-arm switching device 24H, a lower-arm switching device 24L, a first capacitor 22, a diode 26 connected to each switching device, the first terminal 18, the voltage reference terminal 20, and a voltage reference line 28 (voltage reference conductor). The voltage reference line 28 is shared by the U-phase switching circuit 10, the V-phase switching circuit 12, and the additional port circuit 42.

Here, among three terminals provided on each switching device, as shown in FIG. 1, the upper terminal is an upper terminal a and the lower terminal is a lower terminal b. The remaining terminal is a control terminal g for controlling the state between the upper terminal a and the lower terminal b to conduction or open; namely, on or off. Each switching device turns, for example, on as an on voltage is supplied to the terminal g or off as an off voltage lower than the on voltage is supplied to the terminal g.

The lower terminal b of the upper-arm switching device 24H and the upper terminal a of the lower-arm switching device 24L are connected in common. The upper terminal a of the upper-arm switching device 24H is connected to the first terminal 18, and the lower terminal b of the lower-arm switching device 24L is connected to the voltage reference line 28. Between the upper terminal a and the lower terminal b of each switching device is connected the diode 26 with the lower terminal b side serving as an anode. The first capacitor 22 is connected between the first terminal 18 and the voltage reference line 28. To one end of the voltage reference line 28 is provided the voltage reference terminal 20.

The V-phase switching circuit 12 has an upper-arm switching device 34H, a lower-arm switching device 34L, a second capacitor 32, a diode 36 connected to each switching device, the second terminal 30, and the voltage reference line 28.

The lower terminal b of the upper-arm switching device 34H and the upper terminal a of the lower-arm switching device 34L connected in common. The upper terminal of the upper-arm switching device 34H is connected to the second terminal 30 and the lower terminal b of the lower-arm switching device 34L is connected to the voltage reference line 28. Between the upper terminal a and the lower terminal b of each switching device is connected the diode 36 with the lower terminal b side serving as an anode. The second capacitor 32 is connected between the second terminal 30 and the voltage reference line 28.

A primary winding 38 of the transformer 14 is connected between a common connection point of the upper-arm switching device 24H and the lower-arm switching device 24L in the U-phase switching circuit 10 and a common connection point of the upper-arm switching device 34H and the lower-arm switching device 34L in the V-phase switching circuit 12.

The additional port circuit 42 inputs and outputs a DC voltage in a path drawn from a tap on the primary winding 38. The additional port circuit 42 has an inductor 48, a third capacitor 46, and the third terminal 44. One end of the inductor 48 is connected to the tap on the primary winding 38 of the transformer 14 and the other end is connected to the third terminal 44. The third capacitor 46 is connected between the third terminal 44 and the voltage reference line 28. In this embodiment, the tap is a center tap provided at a position where the voltage across the terminals of the primary winding 38 is divided equally into two.

The α-phase switching circuit 16 has an upper-arm switching device 50H, a lower-arm switching device 50L, a first voltage divider capacitor 54, a second voltage divider capacitor 56, a diode 52 connected to each switching device, the positive terminal 58, and the negative terminal 60. The lower terminal b of the upper-arm switching device 50H and the upper terminal a of the lower-arm switching device 50L are connected in common. The upper terminal a of the upper-arm switching device 50H is connected to the positive terminal 58 and the lower terminal b of the lower-arm switching device 50L is connected to the negative terminal 60. Between the upper terminal a and the lower terminal b of each switching device is connected the diode 52 with the lower terminal b serving as an anode.

One end of the first voltage divider capacitor 54 and one end of the second voltage divider capacitor 56 are connected in common. The other end of the first voltage divider capacitor 54 is connected to the positive terminal 58 and the other end of the second voltage divider capacitor 56 is connected to the negative terminal 60. A secondary winding 40 of the transformer 14 is connected between a common connection point of the upper-arm switching device 50H and the lower-arm switching device 50L and a common connection point (voltage divider output point) of the first voltage divider capacitor 54 and the second voltage divider capacitor 56. The first voltage divider capacitor 54 and the second voltage divider capacitor 56 constitute a voltage divider circuit, and a divided voltage between the positive terminal 58 and the negative terminal 60 is supplied to one end of the secondary winding 40 from a common connection point (voltage divider output point) of the first voltage divider capacitor 54 and the second voltage divider capacitor 56.

In the set of the upper-arm switching device 50H and the lower-arm switching device 50L, these two switching devices are each connected in common at one end, and between their other ends is applied (input) a DC voltage or between their other ends is output a DC voltage. Then, by alternately turning on and off the two switching devices, a current flows in accordance with the switching to a path connected to the common connection point. A similar operation is executed also for the set of the upper-arm switching device 24H and the lower-arm switching device 24L and the set of the upper-arm switching device 34H and the lower-arm switching device 34L. In general, this type of set of two switching devices is called a half bridge.

A MOSFET (Metal Oxide Semiconductor Field Effect Transistor), IGBT (Insulated Gate Bipolar Transistor), or the like is employed for each switching device. If a MOSFET is employed for each switching device, the drain terminal corresponds to the upper terminal a, the source terminal corresponds to the lower terminal b, and the gate terminal corresponds to the control terminal g. According to voltage applied to the gate terminal serving as the control terminal g, the on or off state between the drain terminal and the source terminal is controlled. If an IGBT is employed for each switching device, the collector corresponds to the upper terminal a, the emitter corresponds to the lower terminal b, and the gate terminal corresponds to the control terminal g. According to voltage applied to the gate terminal as the control terminal g, the on or off state between the collector terminal and the emitter terminal is controlled.

If vehicle-equipped accessory apparatuses are to be connected to the first terminal 18 of the U-phase switching circuit 10, the second terminal 30 of the V-phase switching circuit 12, and the third terminal 44 of the additional port circuit 42, respectively, a MOSFET may be employed for the switching devices provided in the U-phase switching circuit 10 and the V-phase switching circuit 12. If a secondary battery for the electric powered vehicle is to be connected, for example, to the positive terminal 58 and the negative terminal 60 of the α-phase switching circuit 16, and a high voltage is applied between the positive terminal 58 and the negative terminal 60, an IGBT may be employed for the switching devices provided in the α-phase switching circuit 16.

Figure 2:
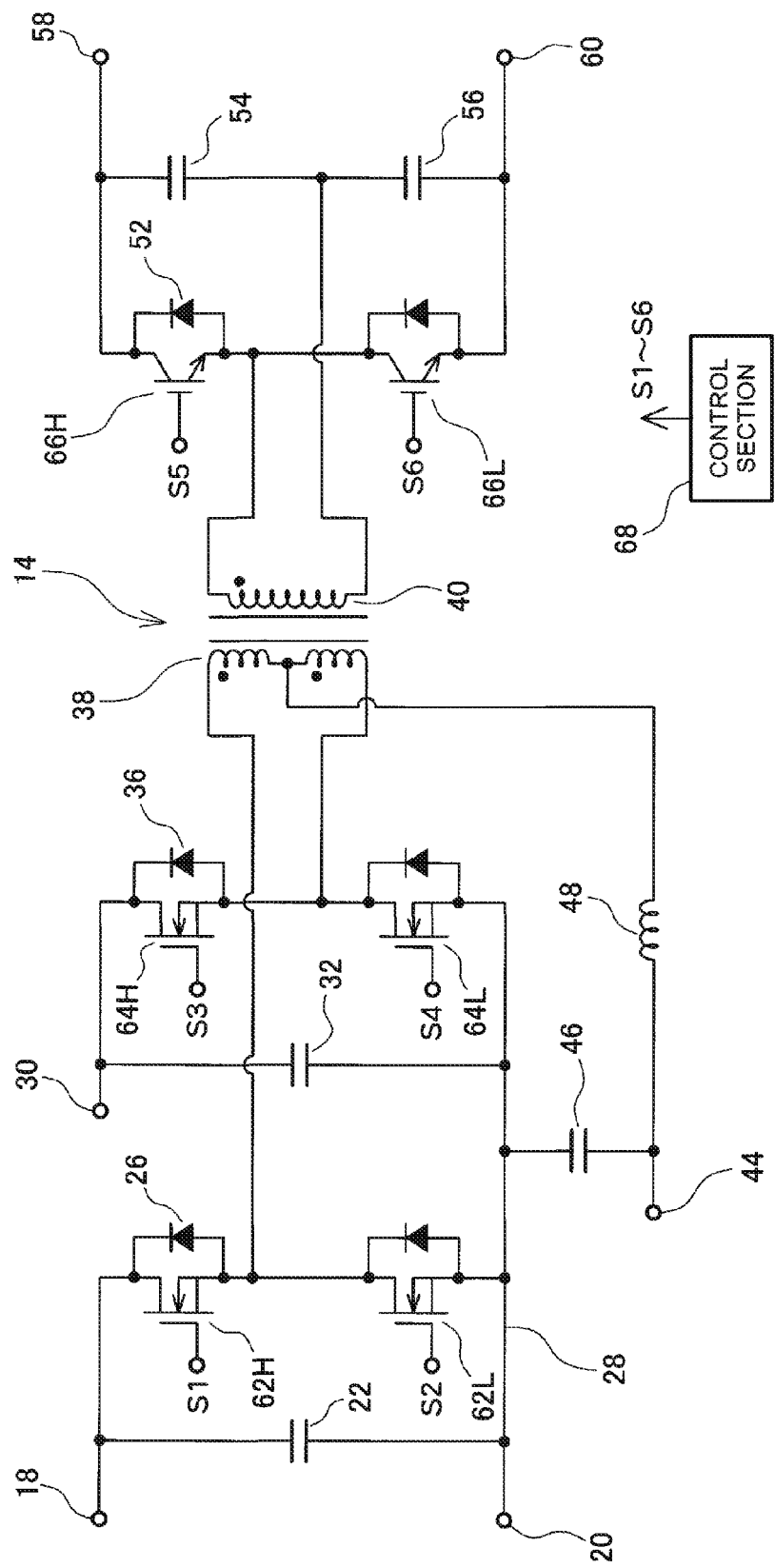
FIG. 2 shows an electric power conversion circuit.

In FIG. 2, a circuit is shown for the case where MOSFET devices are employed for the switching devices provided in the U-phase switching circuit 10 and the V-phase switching circuit 12 and IGBT devices are employed for the switching devices provided in the α-phase switching circuit 16. Namely, MOSFET devices 62H, 62L, 64H, and 64L in FIG. 2 are respectively employed as the switching devices 24H, 24L, 34H, and 34L in FIG. 1, and an IGBT 66H and an IGBT 66L in FIG. 2 are respectively employed as the switching devices 50H and 50L in FIG. 1.

(2) Overview of Operation of Electric Power Conversion Circuit

Operation of the electric power conversion circuit will be described with reference to FIG. 1. A control unit 68 outputs control signals S1 and S2 respectively to the upper-arm switching device 24H and the lower-arm switching device 24L provided in the U-phase switching circuit 10 and controls each switching device on or off. Furthermore, the control unit 68 outputs control signals S3 and S4 respectively to the upper-arm switching device 34H and the lower-arm switching device 34L provided in the V-phase switching circuit 12 and controls each switching device on or off. Moreover, the control unit 68 outputs control signals S5 and S6 respectively to the upper-arm switching device 50H and the lower-arm switching device 50L provided in the α-phase switching circuit 16 and controls each switching device on or off.

The control unit 68 alternately turns on and off the upper-arm switching device 24H and the lower-arm switching device 24L provided in the U-phase switching circuit 10. As the lower-arm switching device 24L switches from on to off, the electromagnetic state in the windings of the transformer 14 and the current flowing to the inductor 48 change so that induced electromotive force is generated at the primary winding 38 and the inductor 48. The first capacitor 22 is charged via the inductor 48, the primary winding 38, and the diode 26 by a voltage based on the induced electromotive force and the charging voltage of the third capacitor 46. From between the first terminal 18 and the voltage reference terminal 20 is output a first voltage V1 in accordance with the charging voltage of the first capacitor 22.

Or as the lower-arm switching device 24L switches from on to off, the upper-arm switching device 24H switches from off to on so that the third capacitor 46 is charged by voltage based on the charging voltage of the first capacitor 22 and the induced electromotive force. The charging path is the upper-arm switching device 24H, the primary winding 38, and the inductor 48. From between the third terminal 44 and the voltage reference terminal 20 is output a third voltage V3 in accordance with the charging voltage of the third capacitor 46.

However, the induced electromotive force generated at the primary winding 38 and the inductor 48 is not necessarily determined only by the operation of the U-phase switching circuit 10. The induced electromotive force is determined by interaction via the transformer 14 based on the respective operations of the U-phase switching circuit 10, the V-phase switching circuit 12, and the α-phase switching circuit 16.

The control unit 68 alternately turns on and off the upper-arm switching device 34H and the lower-arm switching device 34L provided in the V-phase switching circuit 12. By the same operating principle as that of the U-phase switching circuit 10, the induced electromotive force generated at the primary winding 38, the induced electromotive force generated at the inductor 48, and the voltage based on the charging voltage of the third capacitor 46 are applied to the second capacitor 32. The second capacitor 32 is charged by the voltage, and a second voltage V2 is output from between the second terminal 30 and the voltage reference terminal 20. Or due to the charging voltage of the second capacitor 32 and the voltage based on the induced electromotive force, the third capacitor 46 is charged and the third voltage V3 is output from between the third terminal 44 and the voltage reference terminal 20.

The inductor 48 generates induced electromotive force from stepped-up/stepped-down voltage between the first terminal 18 and the third terminal 44 or stepped-up/stepped-down voltage between the second terminal 30 and the third terminal 44 and in addition reduces ripple component included in the current flowing to the primary winding 38. If leakage inductance caused by leakage flux at the transformer 14 is included in the primary winding 38, the third terminal 44 and the tap on the primary winding 38 may be directly connected without using the inductor 48.

The control unit 68 alternately turns on and off the upper-arm switching device 50H and the lower-arm switching device 50L provided in the α-phase switching circuit 16. When the upper-arm switching device 50H is on and the lower-arm switching device 50L is off, the first voltage divider capacitor 54 is charged by the induced electromotive force generated at the secondary winding 40, or electric power in accordance with the charging voltage of the first voltage divider capacitor 54 is supplied to the secondary winding 40. When the upper-arm switching device 50H is off and the lower-arm switching device 50L is on, the second voltage divider capacitor 56 is charged by induced electromotive force generated at the secondary winding 40, or electric power in accordance with the charging voltage of the second voltage divider capacitor 56 is supplied to the secondary winding 40. On the basis of the charging voltage of the first voltage divider capacitor 54 and the second voltage divider capacitor 56, a fourth voltage V4 is output from between the positive terminal 58 and the negative terminal 60. Or in accordance with the fourth voltage V4 applied between the positive terminal 58 and the negative terminal 60, the first voltage divider capacitor 54 and the second voltage divider capacitor 56 are charged.

(3) Timing Chart of Control Signals and Voltages

FIG. 3A, FIG. 3B, and FIG. 3C are timing charts for the control signals S2, S4, and S6, respectively. The x-axis shows time and the y-axis shows signal level. The signal level is, for example, a voltage value. As described above, the control signals S2, S4, and S6 are supplied to the lower-arm switching device 24L, the lower-arm switching device 34L, and the lower-arm switching device 50L, respectively. Each switching device turns on when the control signal is a high level H and turns off when the control signal is a low level L.

Although not shown in FIG. 3A to 3C, the control signal S1 supplied to the upper-arm switching device 24H, the control signal S3 supplied to the upper-arm switching device 34H, and the control signal S5 supplied to the upper-arm switching device 50H are the control signals S2, S4, and S6, respectively, with their high and low levels inverted.

The periods of the control signals S2, S4, and S6 have identical durations of T. To perform a seamless control omitting the period where the voltage applied to the primary winding 38 and the secondary winding 40 of the transformer 14 is zero, the control signal S4 has the high level H and the low level L of the control signal S2 inverted. Therefore, if the duty ratio of the control signal S2 is Du, the control signal S4 has a duty ratio Dv where Dv=1−Du. A duty ratio Dα of the control signal S6 is the same as the duty ratio Du of the control signal S2 (Dα=Du) and the control signal S6 is advanced in phase with respect to the control signal S2 by only a phase difference ϕ. The phase difference ϕ is positive when the control signal S6 is advanced in phase with respect to the control signal S2.

In this manner, the control signal S2 is in one period at high level H only during time Du·T and at low level L only during time (1−Du)·T and repeatedly alternates between the high level H and the low level L. The control signal S4 is in one period at high level H only during time Dv·T=(1−Du)·T and at low level L only during time (1−Dv)·T=Du·T and repeatedly alternates between the high level H and the low level L. The control signal S6 is in one period at high level H only during time Dα·T=Du·T and at low level L only during time (1−Dα)·T=(1−Du)·T and repeatedly alternates between the high level H and the low level L.

FIG. 3D shows a terminal voltage Vp across the primary winding 38 (hereinafter referred to as primary voltage Vp). The primary voltage Vp is considered a positive voltage when the electric potential of the upper end of the primary winding 38 in the circuit diagram in FIG. 1 is higher than the electric potential of the lower end of the primary winding 38 in FIG. 1. At a timing where the control signal S2 becomes low level L and the control signal S4 becomes high level H, the primary voltage Vp becomes the first voltage V1.

Namely, the upper-arm switching device 24H and the lower-arm switching device 34L turn on and the lower-arm switching device 24L and the upper-arm switching device 34H turn off causing the upper end of the primary winding 38 to connect to the first terminal 18 and the lower end to connect to the voltage reference terminal 20 so that the primary voltage Vp becomes the first voltage V1.

At a timing where the control signal S2 is at the high level L and the control signal S4 is at the low level L, the primary voltage Vp becomes a negative second voltage −V2. Namely, the upper-arm switching device 24H and the lower-arm switching device 34L turn off and the lower-arm switching device 24L and the upper-arm switching device 34H turn on, causing the upper end of the primary winding 38 to connect to the voltage reference terminal 20 and the lower end to connect to the second terminal 30 so that the primary voltage Vp becomes negative second voltage −V2.

FIG. 3E shows a terminal voltage Vs across the secondary winding 40 (hereinafter referred to as secondary voltage Vs). The secondary voltage Vs is considered a positive voltage when the electric potential of the upper end of the secondary winding 40 in the circuit diagram in FIG. 1 is higher than the electric potential of the lower end of the secondary winding 40 in FIG. 1. At a timing where the control signal S6 becomes low level L, the secondary voltage Vs becomes Vs=C2·V4/(C1+C2), and at a timing where the control signal S6 becomes high level H, the secondary voltage Vs becomes Vs=C1·V4/(C1+C2), where C1 and C2 are the capacitances of the first voltage divider capacitor 54 and the second voltage divider capacitor 56, respectively.

Namely, at the timing where the control signal S6 becomes low level L, the upper-arm switching device 50H turns on and the lower-arm switching device 50L turns off. As a result, the upper end and the lower end of the secondary winding 40 connect to the upper end and the lower end of first voltage divider capacitor 54, respectively, and the secondary voltage Vs becomes a terminal voltage VC1 across the first voltage divider capacitor 54.

From the fourth voltage V4, which is the voltage of the positive terminal 58 with reference to the negative terminal 60, the terminal voltage VC1 across the first voltage divider capacitor 54 is expressed by VC1=C2·V4/(C1+C2). Therefore, at the timing where the control signal S6 becomes low level L, the secondary voltage Vs becomes Vs=VC1=C2·V4/(C1+C2).

At a timing where the control signal S6 becomes high level H, the upper-arm switching device 50H turns off and the lower-arm switching device 50L turns on. As a result, the upper end and the lower end of the secondary winding 40 connect to the lower end and the upper end of the second voltage divider capacitor 56, respectively, and the secondary voltage Vs becomes negative terminal voltage −VC2 of the second voltage divider capacitor 56.

The terminal voltage VC2 across the second voltage divider capacitor 56 is expressed by VC2=C1·V4/(C1+C1). Therefore, at the timing where the control signal S6 becomes high level H, the secondary voltage Vs becomes Vs=−VC2=−C1·V4/(C1+C1).

FIG. 3F shows a current iu flowing to the primary winding 38. The current iu is positive in the direction flowing to the upper end of the primary winding 38. After the secondary voltage Vs rises, during a time τ1 until the primary voltage Vp rises, currents flowing to the windings vary in accordance with a difference between the primary voltage Vp and the secondary voltage Vs. As a result, during time τ1, the primary winding current iu suddenly changes from a negative value to a positive value.

After the primary voltage Vp rises, during a time τ2 until the secondary voltage Vs falls, the difference between the primary voltage Vp and the secondary voltage Vs becomes relatively small and the change in currents flowing to the windings becomes small. As a result, during time τ2, the primary winding current iu changes gradually as compared to the case during time τ1.

After the secondary voltage Vs falls, during a time τ3 until the primary voltage Vp falls, the currents flowing to the windings change in accordance with the difference between the primary voltage Vp and the secondary voltage Vs. As a result, during time τ3 the primary winding current iu suddenly changes from a positive value to a negative value.

After the primary voltage Vp falls, during a time τ4 until the secondary voltage Vs rises, the difference between the primary voltage Vp and the secondary voltage Vs becomes relatively small and the change in currents flowing to the windings becomes small. As a result, during a time τ4 the primary winding current iu changes gradually as compared to the case during time τ3. Thereafter, a change similar to the change from time τ1 to time τ4 is repeated.

While the control signal S2 is low level L and the control signal S4 is high level H, electric power determined by the product of the primary voltage Vp and the primary winding current iu is transferred between the primary winding 38 and the U-phase switching circuit 10. On the other hand, while the control signal S2 is high level H and the control signal S4 is low level L, electric power determined by the product of the primary voltage Vp and the primary winding current iu is transferred between the primary winding 38 and the V-phase switching circuit 12.

The U-phase switching circuit 10 and the V-phase switching circuit 12 transfer electric power with the respectively connected load apparatuses or electric power storage devices in accordance with the electric power transferred with the primary winding 38. Electric power thereof is determined by the magnitude of the phase difference ϕ. Namely, the amount of change of the primary winding current iu in times τ1 and τ3 varies in accordance with the magnitude of the phase difference ϕ. According to the amount of change, the peak value of the primary winding current iu is determined and electric power to be transferred between the primary winding 38 and the U-phase switching circuit 10 and electric power to be transferred between the primary winding 38 and the V-phase switching circuit 12 are determined.

While the control signal S6 is low level L, electric power determined by the product of the secondary voltage Vs and the current flowing to the secondary winding 40 is transferred between the secondary winding 40 and the first voltage divider capacitor 54. While the control signal S6 is high level H, electric power determined by the product of the secondary voltage Vs and the current flowing to the secondary winding 40 is transferred between the secondary winding 40 and the second voltage divider capacitor 56. The α-phase switching circuit 16 transfers electric power with a directly connected load apparatus or electric power storage device in accordance with a state of charge of the first voltage divider capacitor 54 and the second voltage divider capacitor 56.

In the electric power conversion circuit relating to the present embodiment, there is a relationship of Dv=1−Du between the duty ratio Du with respect to the lower-arm switching device 24L in the U-phase switching circuit 10 and the duty ratio Dv with respect to the lower-arm switching device 34L in the V-phase switching circuit 12. Namely, the half bridge in the U-phase switching circuit 10 and the half bridge in the V-phase switching circuit 12 have an inverse relationship in on-off states. As a result, as shown in FIG. 3D, there is no period where the voltage is zero for the primary voltage Vp.

Furthermore, according to the operation of the α-phase switching circuit 16, the secondary winding 40 alternately connects to the first voltage divider capacitor 54 and the second voltage divider capacitor 56. As a result, as shown in FIG. 3E, there is no period where the voltage is zero for the secondary voltage Vs.

Through the execution of such seamless control, the period where electric power transfer is not performed at the primary winding side and the secondary winding side of the transformer 14 is reduced and electric power transferred per a fixed time increases.

(4) Determination of Capacitance of Each Voltage Divider Capacitor

Individual capacitances of the first voltage divider capacitor 56 and the second voltage divider capacitor 56 are determined in the following manner. Namely, each capacitance is determined so that n times the positive peak value of the primary voltage Vp and the positive peak value of the secondary voltage Vs are the same, and n times the negative peak value of the primary voltage Vp and the negative peak value of the secondary voltage Vs are the same, where n is the ratio of the number of windings of the secondary winding 40 with respect to the number of windings of the primary winding 38.

The positive peak value of the primary voltage Vp is V1 and the positive peak value of the secondary voltage Vs is C2·V4/(C1+C1). Therefore, a first condition for determining each voltage divider capacitance is expressed by the following formula 1.

$$n \cdot V1 = C2 \cdot V4/(C1+C2) \quad \text{(Formula 1)}$$

On the other hand, the negative peak value of the primary voltage Vp is V2 and the negative peak value of the secondary voltage Vs is C1·V4/(C1+C1). Therefore, a second condition for determining each voltage divider capacitance is expressed by the following formula 2.

$$n \cdot V2 = C1 \cdot V4/(C1+C2) \quad \text{(Formula 2)}$$

If the first voltage V1 and the second voltage V2 are predetermined by design specifications, each capacitance of the first voltage divider capacitor 54 and the second voltage divider capacitor 56 may be determined so as to satisfy C2/C1=V1/V2.

As a result, in a period where the primary voltage Vp and the secondary voltage Vs have the same polarity (periods Q1 and Q2 in FIG. 3D), n times the primary voltage Vp and the secondary voltage Vs are the same. Thus, current flowing to each winding decreases and loss generated at the transformer 14 decreases.

More specifically, as described with reference to FIG. 3D, the U-phase switching circuit 10 and the V-phase switching circuit 12 alternately in time supply the first voltage V1 and the negative second voltage −V2 across the terminals of the primary winding 38. Furthermore, as described with reference to FIG. 3E, according to the switching operation of the half bridge provided in the α-phase switching circuit 16, the first voltage divider capacitor 54 and the second voltage divider capacitor 56 alternately connect to the secondary winding 40 so that the terminal voltage of the first voltage divider capacitor 54 and the terminal voltage of the second voltage divider capacitor 56 are alternately applied to the secondary winding 40. Then, the value of each capacitor is determined as described hereinabove so that the first voltage divider capacitor 54 and the second voltage divider capacitor 56 divide the voltage appearing between the positive terminal 58 and the negative terminal 60 at a voltage division ratio in accordance with the ratio of the first voltage V1 to the second voltage V2. As a result, in a period where the primary voltage Vp and the secondary voltage Vs have the same polarity, n times the primary voltage Vp and the secondary voltage Vs are the same and loss generated at the transformer 14 is reduced.

(5) Interrelationship of First Voltage V1 Through Fourth Voltage V4

Next, the interrelationship of the first voltage V1 through the fourth voltage V4 will be described with reference to FIG. 1. Here, a state where each voltage has converged to a constant value will be described. In this state, the phase difference φ shown in FIG. 3A is zero. Voltage control at each terminal as described hereinafter is performed by changing the switching state.

A relationship between the third voltage V3 in the additional port circuit 42 and the first voltage V1 in the U-phase switching circuit 10 is expressed through duty ratio Du as shown in the following formula 3.

$$V3=(1-Du) \cdot V1 \quad \text{(Formula 3)}$$

Similarly, a relationship between the third voltage V3 in the additional port circuit 42 and the second voltage V2 in the V-phase switching circuit 12 is expressed through the duty ratio Dv in the following formula 4.

$$V3=(1-Dv) \cdot V2 \quad \text{(Formula 4)}$$

When seamless control satisfying Dv=1−Du is executed, $$V3=Du \cdot V2 \quad \text{(Formula 5)}$$

is satisfied. When Du is erased from Formula 3 and Formula 5, the third voltage V3 is expressed using the first voltage V1 and the second voltage V2 in the following formula 6.

$$V3=V1 \cdot V2/(V1+V2) \quad \text{(Formula 6)}$$

Furthermore, a relationship among the fourth voltage V4, the first voltage V1, and the second voltage V2 is expressed in the following Formula 7 using Formula 1 and Formula 2.

$$V4=n \cdot (V1+V2) \quad \text{(Formula 7)}$$

(6) Design of Voltage Value of Each Terminal

When any three of the first voltage V1 through fourth voltage V4 are determined by design specifications, the remaining one voltage and the winding ratio n are determined on the basis of Formula 6 and Formula 7. For example, suppose a rechargeable battery for the electric powered vehicle is connected between the positive terminal 58 and the negative terminal 60, and V4=200V. An accessory apparatus operating at V1=14V is connected between the first terminal 18 and the voltage reference terminal 20 and an accessory apparatus operating at V2=11V is connected between the second terminal 30 and the voltage reference terminal 20. In this case, on the basis of Formula 6, the third voltage V3 requires V3=6.16V. An accessory apparatus operating at V3=6.16V or an electric power storage device outputting a voltage of V3=6.16V can be connected between the third terminal 44 and the voltage reference terminal 20. Furthermore, on the basis of Formula 7, n=8 is determined for the winding ratio n of the transformer 14.

Furthermore, when any two voltages of the first voltage V1 through the fourth voltage V4 are determined by design specifications with the winding ratio n predetermined, the remaining two voltages are determined on the basis of Formula 6 and Formula 7.

For example, suppose a rechargeable battery of an electric powered vehicle, where V4=200V, is connected between the positive terminal 58 and the negative terminal 60. An accessory apparatus operating at V1=14V is connected between the first terminal 18 and the voltage reference terminal 20 and the winding ratio n of the transformer 14 is 8. In this case, the second voltage V2 of 11 V is obtained on the basis of Formula 7. An accessory apparatus operating at V2=11V or an electric power storage device outputting a voltage of V2=11V can be connected between the second terminal 30 and the voltage reference terminal 20. Furthermore, the third voltage V3 of V3=6.16V is obtained on the basis of Formula 6. An accessory apparatus operating at V3=6.16V or an electric power storage device outputting a voltage of V3=6.16V can be connected between the third terminal 44 and the voltage reference terminal 20.

(7) Transformer Structure

As shown in FIG. 3D and FIG. 3E, the primary voltage Vp and the secondary voltage Vs include a DC component. Thus, a magnetic flux passing a core penetrating the primary winding 38 and the secondary winding 40 of the transformer 14 includes a bias component. To inhibit the generation of magnetic saturation due to the bias component, a gap may be provided in a magnetic path formed by the core.

(8) Control of Electric Power Conversion Circuit

Figure 4:
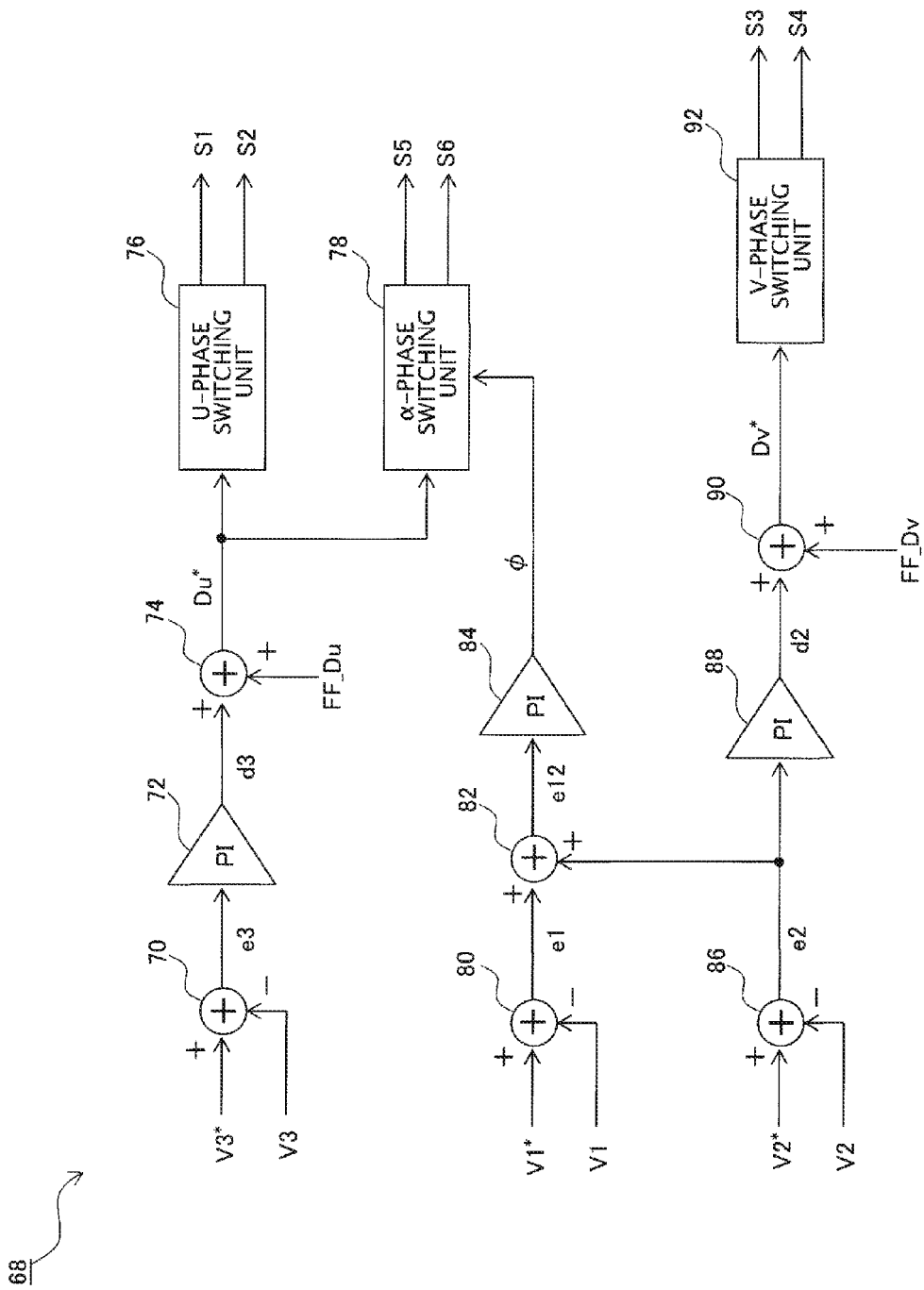
FIG. 4 is a functional block diagram of a control unit.

FIG. 4 shows a functional block diagram of the control unit 68. The control unit 68 has a U-phase switching unit 76 for performing switching for the U-phase switching circuit, a V-phase switching unit 92 for performing switching for the V-phase switching circuit, and an α-phase switching unit 78 for performing switching for the α-phase switching circuit.

In the control unit 68, due to a feedback control for the third voltage V3 and a feed forward control for the duty ratio Du, a duty ratio command value Du*, which is a command value for the duty ratio Du, is obtained. The U-phase switching unit 76 outputs the control signals S1 and S2 on the basis of the duty ratio command value Du*.

Furthermore, in the control unit 68, the phase difference φ is obtained due to the feedback control for the first voltage V1 and the second voltage V2. The α-phase switching unit 78 outputs the control signals S5 and S6 having phases advanced by only the phase difference φ with respect to the control signals S1 and S2 on the basis of the duty command value Du* and the phase difference φ.

Moreover, in the control unit 68, a duty ratio command value Dv*, which is a command value regarding duty ratio Dv, is obtained on the basis of feedback control for the second voltage V2 and feed forward control for the duty ratio Dv. The V-phase switching unit 92 outputs the control signals S3 and S4 on the basis of the duty ratio command value Dv*.

Feedback control and feed forward control will be described more specifically. An adder 70 inputs a third voltage command value V3* and a measured value of the third voltage V3 having inverted polarity. The adder 70 obtains an error e3, which is the measured value V3 subtracted from the command value V3*, and outputs the same to a proportional integrator 72. The proportional integrator 72 obtains a proportional integration error d3 by integrating the error e3 and multiplying by an appropriate constant and outputs the result to an adder 74. To the adder 74 is input a feed forward duty ratio FF_Du. The duty ratio FF_Du is obtained from the following Formula 8 on the basis of Formula 3.

$$FF\_Du = 1 - V3^*/V1^* \qquad \text{(Formula 8)}$$

The adder 74 obtains the duty ratio command value Du* by adding the proportional integration error d3 and FF_Du and outputs the results to the U-phase switching unit 76 and the α-phase switching unit 78.

To an adder 86 are input a second voltage command value V2* and a measured value of the second voltage V2 having inverted polarity. The adder 86 obtains an error e2, which is the measured value V2 subtracted from the command value V2*, and outputs the same to a proportional integrator 88. The proportional integrator 88 obtains a proportional integration error d2 by integrating the error e2 and multiplying by an appropriate constant and outputs the result to an adder 90. To the adder 90 is input a feed forward duty ratio FF_Dv. The FF_Dv is obtained by the following Formula 9 on the basis of Formula 4.

$$FF\_Dv = 1 - V3^*/V2^* \qquad \text{(Formula 9)}$$

The adder 90 obtains the duty command value Dv* by adding the proportional integration error d2 and the FF_Dv and outputs the result to the V-phase switching unit 92.

To an adder 80 are input the first voltage command value V1* and a measured value of the first voltage V1 having inverted polarity. The adder 80 obtains an error e1, which is the measured value V1 subtracted from the command value V1* and outputs the same to an adder 82. To the adder 82 is input the error e2, which is the measured value V2 subtracted from the command value V2*. The adder 82 outputs an error e12, in which error e1 and error 2 are added, to a proportional integrator 84. The proportional integrator 84 obtains the phase difference φ by integrating the error e12 and multiplying by an appropriate constant and outputs the result to the α-phase switching unit 78.

According to this configuration, the control signals S1 and S2 for the U-phase switching circuit are generated on the basis of feedback control based on the difference between the third voltage command value V3* and the measured value of the third voltage V3, and the control signals S3 and S4 for the V-phase switching circuit are generated on the basis of feedback control based on the difference between the second voltage command value V2* and the measured value of the second voltage V2. Furthermore, at the generation of the control signals S1 and S2, feed forward control for the duty ratio Du is executed and at the generation of the control signals S3 and S4, feed forward control for the duty ratio Dv is executed.

As a result, the second voltage V2 and the third voltage V3 quickly approach each command value or quickly adjust to each command value. Namely, the difference with each command value for the second voltage V2 and the third voltage V3 is quickly compensated. The first voltage V1 is uniquely determined from the second voltage V2 and the third voltage V3 so that control for the first voltage V1 is also executed together with control for the second voltage V2 and the third voltage V3.

Furthermore, according to this configuration, the phase difference is obtained on the basis of the difference between the first voltage command value V1* and the measured value of the first voltage V1 and the difference between the second voltage command value V2* and the measured value of the second voltage V2. As a result, the difference from each command value for the first voltage V1 and the second voltage V2 is compensated for by adjustment of switching timing of the α-phase switching unit 78.

Instead of the α-phase switching unit 78 executing control for the phase difference φ, the U-phase switching unit 76 and the V-phase switching unit 92 may execute control for the phase difference φ. In this case, the U-phase switching unit 76 takes the control signals S1 and S2 to control signals having a delay of only phase difference φ with respect to the control signals S5 and S6 respectively. The V-phase switching unit 92 uses the control signals S1 and S2 having inverted high level and low level for the control signals S3 and S4, respectively.

Furthermore, when the voltage values of the first voltage V1 to the fourth voltage V4 converge on fixed values, the case was described hereinabove where the control signals S1 and S2 become the same phase as the control signals S5 and S6, respectively, and the half bridge of the α-phase switching circuit 16 and the half bridge of the U-phase switching circuit 10 operate in phase. Besides this operation, when the voltage values of the first voltage V1 to the fourth voltage V4 converge on fixed values, an operation may be executed so that the half bridge of the α-phase switching circuit 16 and the half bridge of the V-phase switching circuit 12 operate in phase. The control signals S3 and S4 become the same phase as the control signals S5 and S6, respectively, and the control signals S1 and S2 become signals having inverted high level and low level with respect to the control signals S3 and S4, respectively. Capacitances of the first voltage divider capacitor 54 and the second voltage divider capacitor 56 may be determined to satisfy C1/C2=V1/V2.

Figure 5:
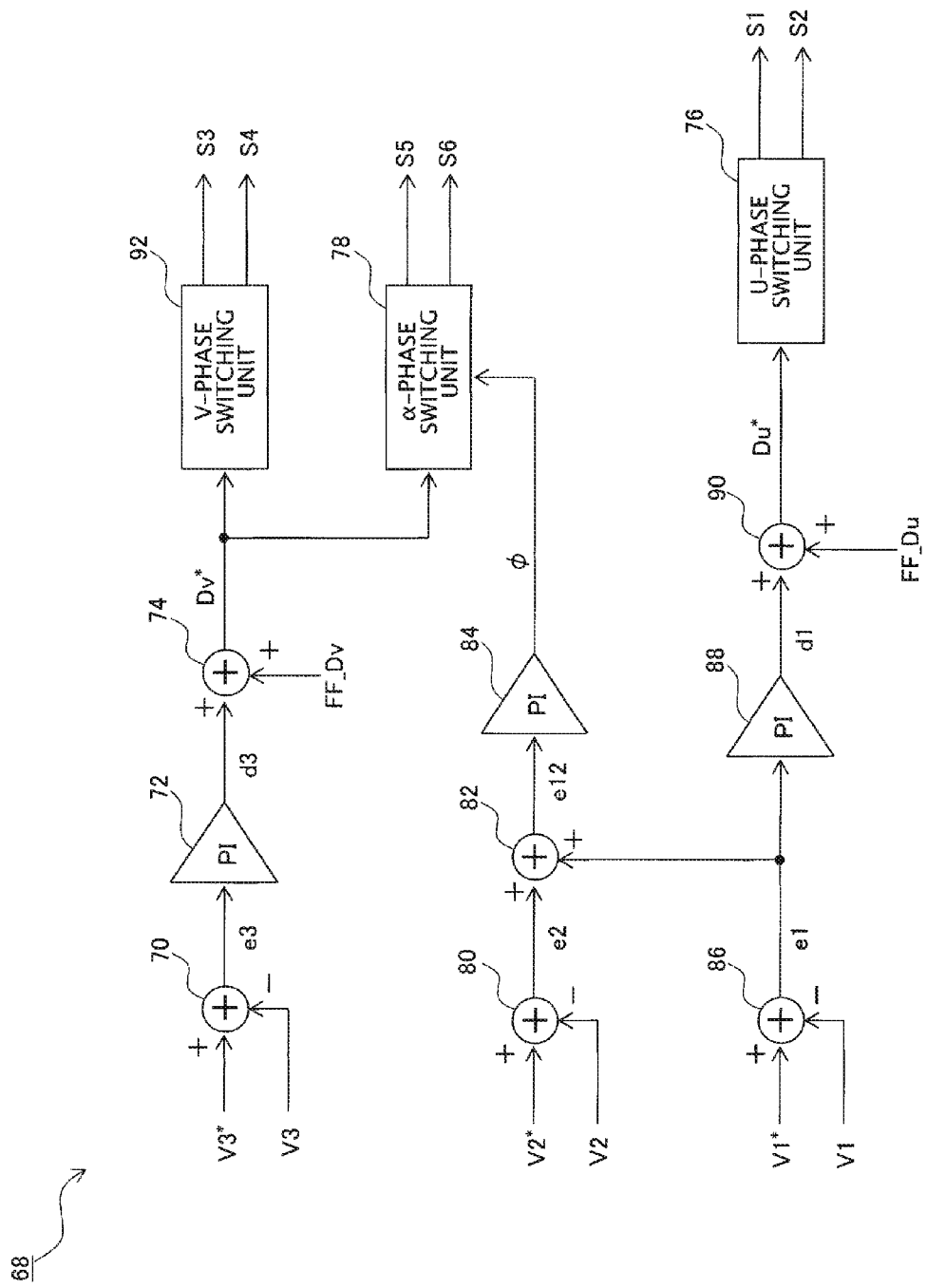
FIG. 5 is a functional block diagram of a control unit.

Functional blocks of the control unit 68 in this case are shown in FIG. 5. The functional blocks shown in this figure have the functions of the U-phase and the V-phase exchanged with respect to FIG. 4. Namely, the first voltage command value V1* and the measured value of the first voltage V1 are exchanged with the second voltage command value V2* and the measured value of the second voltage V2, respectively, and the duty ratio Du and the duty ratio command value Du* are exchanged with the duty ratio Dv and the duty ratio command value Dv*, respectively. Furthermore, the U-phase switching unit 76 and the V-phase switching unit 92 are exchanged.

Furthermore, seamless control satisfying Dv=1−Du was described hereinabove. If the electric power to be transferred within a specific time is not a problem, Dv may be set to a value smaller than 1−Du.

The invention claimed is:
1. An electric power conversion circuit comprising:
a U-phase switching circuit, a V-phase switching circuit, and an α-phase switching circuit, which comprise switching devices; and
a transformer including a primary winding connected between said U-phase switching circuit and said

V-phase switching circuit and a secondary winding of which both ends are connected to said α-phase switching circuit; wherein said α-phase switching circuit comprises:
- a DC terminal pair for inputting and outputting a DC voltage,
- a half bridge comprising two switching devices each having one terminal connected in common, and the half bridge disposed between the two terminals constituting said DC terminal pair, and
- a voltage divider circuit, disposed between the two terminals constituting said DC terminal pair, for dividing the voltage appearing at said DC terminal pair, wherein
- a common connection point of the two switching devices in said half bridge is connected to a first end of said secondary winding, and
- a voltage divider output point of said voltage divider circuit is connected to a second end of said secondary winding, said U-phase switching circuit comprises two switching devices each having one terminal connected in common and a U-phase half bridge for inputting and outputting a first DC voltage at the other terminal of each switching device that is connected to a first voltage supply, said V-phase switching circuit comprises two switching devices each having one terminal connected in common and a V-phase half bridge for inputting and outputting a second DC voltage at the other terminal of each switching device that is connected to a second voltage supply, the second voltage supply being different from the first voltage supply, wherein:

said primary winding is connected between the common connection point of the two switching devices in said U-phase half bridge and the common connection point of the two switching devices in said V-phase half bridge, a voltage in accordance with the first DC voltage which is input and output at said U-phase switching circuit is supplied to said primary winding from the first voltage supply of said U-phase switching circuit, a voltage in accordance with the second DC voltage which is input and output at said V-phase switching circuit is supplied to said primary winding from the second voltage supply of said V-phase switching circuit, the first end of said secondary winding, which is connected to the common connection point of the two switching devices in said half bridge of said α-phase switching circuit, has a same polarity as a first end of the primary winding that is connected to the common connection point of the two switching devices in said U-phase half bridge, and the second end of said secondary winding, which is connected to the voltage divider output point of said voltage divider circuit, has a different polarity than the first end of said secondary winding and the first end of said primary winding.

2. An electric power conversion circuit according to claim 1, wherein:
said U-phase switching circuit and said V-phase switching circuit supply alternately in time the first DC voltage and the second DC voltage to said primary winding,
said half bridge of the α-phase switching circuit performs switching at a timing in accordance with a timing at which each of said U-phase switching circuit and said V-phase switching circuit supplies the first DC voltage and the second DC voltage to said primary winding, and said voltage divider circuit divides the voltage appearing at said DC terminal pair at a ratio of the first DC voltage supplied to said primary winding by said U-phase switching circuit and the second DC voltage supplied to said primary winding by said V-phase switching circuit.

3. An electric power conversion circuit according to claim 2, wherein:
said voltage divider circuit comprises a first voltage divider capacitor and a second voltage divider capacitor each having one end connected in common to said voltage divider output point,
the other end of said first voltage divider capacitor is connected to one of two terminals constituting said DC terminal pair, and
the other end of said second voltage divider capacitor is connected to the other of two terminals constituting said DC terminal pair.

4. An electric power conversion circuit according to claim 2, wherein:
a third DC voltage is input or output in a path drawn from a tap on said primary winding.

5. An electric power conversion circuit according to claim 4, wherein:
said U-phase switching circuit and said V-phase switching circuit comprise a voltage reference conductor,
said U-phase switching circuit comprises a first terminal for inputting and outputting the first DC voltage with said voltage reference conductor,
said V-phase switching circuit comprises a second terminal for inputting and outputting the second DC voltage with said voltage reference conductor,
the path drawn from the tap on said primary winding comprises a third terminal for inputting and outputting the third DC voltage with said voltage reference conductor, and
the third DC voltage between said third terminal and said voltage reference conductor is determined in accordance with the first DC voltage between said first terminal and said voltage reference conductor and the second DC voltage between said second terminal and said voltage reference conductor.

6. An electric power conversion circuit according to claim 1, wherein:
said voltage divider circuit comprises a first voltage divider capacitor and a second voltage divider capacitor each having one end connected in common to said voltage divider output point,
the other end of said first voltage divider capacitor is connected to one of two terminals constituting said DC terminal pair, and
the other end of said second voltage divider capacitor is connected to the other of two terminals constituting said DC terminal pair.

7. An electric power conversion circuit according to claim 6, wherein:
a third DC voltage is input or output in a path drawn from a tap on said primary winding.

8. An electric power conversion circuit according to claim 7, wherein:
said U-phase switching circuit and said V-phase switching circuit comprise a voltage reference conductor,
said U-phase switching circuit comprises a first terminal for inputting and outputting the first DC voltage with said voltage reference conductor, said V-phase switching circuit comprises a second terminal for inputting and outputting the second DC voltage with said voltage reference conductor, the path drawn from the tap on said primary winding comprises a third terminal for inputting and outputting the third DC voltage with said voltage reference conductor, and the third DC voltage between said third terminal and said voltage reference conductor is determined in accordance with the first DC voltage between said first terminal and said voltage reference conductor and the second DC voltage between said second terminal and said voltage reference conductor.

9. An electric power conversion circuit according to claim 1, wherein:
a third DC voltage is input or output in a path drawn from a tap on said primary winding.

10. An electric power conversion circuit according to claim 9, wherein:
said U-phase switching circuit and said V-phase switching circuit comprise a voltage reference conductor, said U-phase switching circuit comprises a first terminal for inputting and outputting the first DC voltage with said voltage reference conductor, said V-phase switching circuit comprises a second terminal for inputting and outputting the second DC voltage with said voltage reference conductor, the path drawn from the tap on said primary winding comprises a third terminal for inputting and outputting the third DC voltage with said voltage reference conductor, and the third DC voltage between said third terminal and said voltage reference conductor is determined in accordance with the first DC voltage between said first terminal and said voltage reference conductor and the second DC voltage between said second terminal and said voltage reference conductor.

* * * * *